I. N. KEIM.
RESILIENT VEHICLE TIRE.
APPLICATION FILED DEC. 5, 1917.
1,267,230.
Patented May 21, 1918.
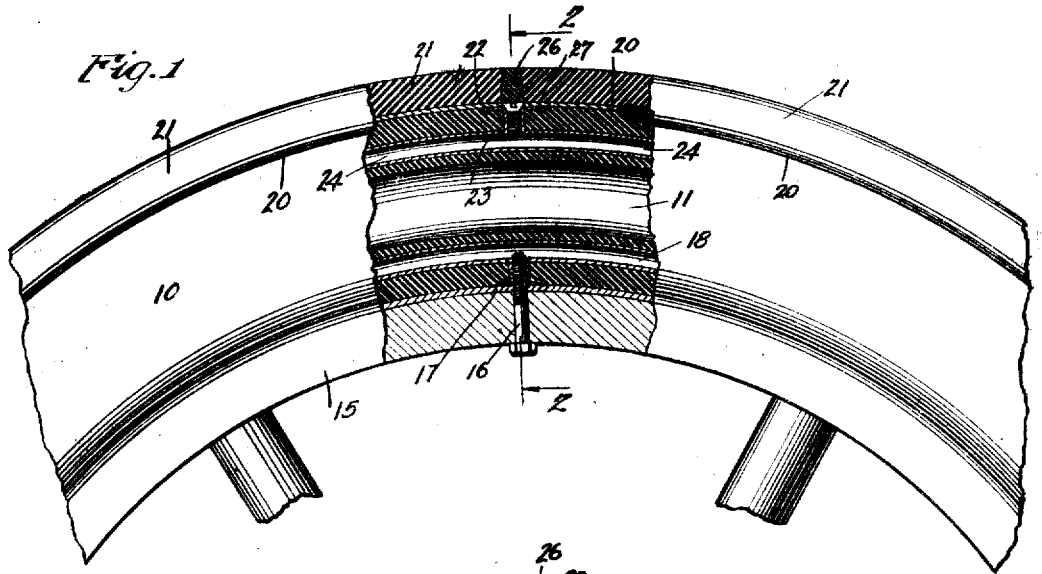
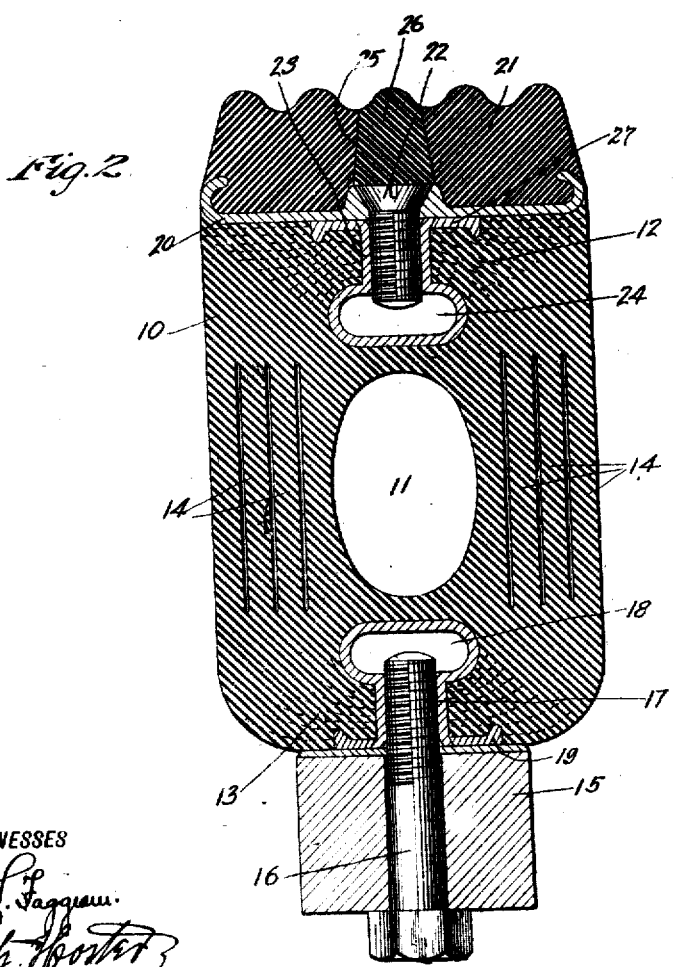
WITNESSES
INVENTOR
Ivan N. Keim
BY
ATTORNEYS

UNITED STATES PATENT OFFICE.

IVAN NAIR KEIM, OF MOUNT HOLLY, NEW JERSEY.

RESILIENT VEHICLE-TIRE.

1,267,230.

Specification of Letters Patent.

Patented May 21, 1918.

Application filed December 5, 1917. Serial No. 205,529.

*To all whom it may concern:*

Be it known that I, IVAN N. KEIM, a citizen of the United States, and a resident of Mount Holly, in the county of Burlington and State of New Jersey, have invented a new and improved Resilient Vehicle-Tire, of which the following is a full, clear, and exact description.

The object of the invention is to provide a new and improved resilient vehicle tire having a body made of rubber or similar resilient material subjected to flexion and extension and eliminating direct compression thus rendering the tire exceedingly serviceable and providing the desired cushioning effect.

In order to accomplish the desired result, use is made of a resilient body in the form of a hollow rubber annulus adapted to be fastened to the felly of the wheel, a floating metal rim attached to the peripheral face of the said resilient body, and a rubber tread attached to the said floating metal rim.

A practical embodiment of the invention is represented in the accompanying drawings forming a part of this specification, in which similar characters of reference indicate corresponding parts in both views.

Figure 1 is a side elevation of a portion of a resilient vehicle tire as applied and with parts shown in section; and Fig. 2 is an enlarged cross section of the same on the line 2—2 of Fig. 1.

The body 10 of the vehicle tire is in the form of an annulus of rubber or a similar resilient material. The body 10 is approximately rectangular in cross section and its opening 11 is preferably made oval in cross section with the major axis disposed in a vertical plane, as indicated in Fig. 2. The body 10 is reinforced adjacent its outer peripheral face by layers 12 of fabric material, and similar fabric layers 13 are arranged adjacent the inner face of the body 10. The side walls of the body 10 are preferably made in layers 14 disconnected from each other at the middle portion of the body to render the body 10 exceedingly flexible in a lateral direction and to prevent overheating of the body.

The inner face of the body 10 fits on the peripheral face of the felly 15 and the body 10 is secured thereto by bolts 16 extending radially through the felly 15 and screwing into threaded bosses 17 projecting inwardly from a hollow ring 18 embedded in the body 10 intermediate the inner face and the bottom of the opening 11. A washer 19 is riveted on the boss 17 and embedded in the inner face of the body 10. By the arrangement described the body 10 is securely fastened to the felly 15 along the median center line of the body and the felly, thus allowing free flexing of the body 10 in a sidewise direction.

On the peripheral face of the body 10 fits a floating rim 20 carrying the solid tread 21, of rubber or other suitable material, and the said floating rim 20 is engaged by screws 22 screwing into threaded bosses 23 projecting outwardly from a hollow ring 24 embedded in the body 10 adjacent the peripheral face thereof. It will be noticed that the ring 24 is embedded in the body 10 intermediate the top of the opening 11 and the middle portion of the peripheral face of the body 10, and by this arrangement sidewise flexing of the body 10 is not interfered with. It will also be noticed that the ring 24 provides a firm support for the floating rim 20 and prevents accidental bending thereof. The tread 21 is vulcanized or otherwise attached to the floating rim 20, and is provided with openings 25 in register with the screws 22 to permit of screwing the latter into the bosses 23 or unscrewing the same therefrom whenever it is desired to fasten the rim and tread in place on the body 10 or to remove them therefrom. The openings 25 are normally filled with rubber plugs 26 to render the peripheral face of the tread of unbroken continuity. The rubber plugs 26 are preferably made conical to prevent the same from accidentally becoming detached from the tread 21, and the plugs 26 also serve to hold the screws 22 from accidentally screwing out of the bosses 23. A washer 27 is riveted on each boss 23 and is embedded in the peripheral face of the body 10 and is in contact with the floating rim 20. The washers 19 and 27 reinforce the body 10 at the holes engaged by the bosses 17 and 23.

It is understood that the resilient side walls of the body 10, coming at the top of a wheel when the tire is fastened thereto, are stretched or extended under the load or radial strain; the side walls coming at the sides of the wheel are extended; and those at the bottom of the wheel are flexed downward and outward. Thus direct compression, such as is found in solid tires, is eliminated, it being understood that rubber is more elastic on flexion or extension than on direct compression.

The resilient vehicle tire is exceedingly simple in construction and composed of comparatively few parts not liable to get out of order, and the body is constructed to practically eliminate direct compression and to substitute flexion and extension.

Having thus described my invention, I claim as new and desire to secure by Letters Patent:—

1. A resilient vehicle tire, comprising a resilient body in the form of a hollow rubber annulus adapted to be fastened to the felly of the wheel, the body being approximately rectangular in cross section and having annular passages in its sides at the middle, a floating metal rim attached to the peripheral face of the said resilient body, and a rubber tread attached to the said floating metal rim.

2. A resilient vehicle tire, comprising a resilient body in the form of a hollow annulus adapted to be fastened to the felly of a wheel, a ring embedded in the said body adjacent the peripheral face thereof, a floating rim on the peripheral face of the said body, fastening devices fastening the said floating rim to the said ring, and a solid rubber tread attached to the said floating rim.

3. A resilient vehicle tire, comprising a resilient body in the form of a hollow annulus adapted to be fastened to the felly of a wheel a ring embedded in the said body adjacent the peripheral face thereof, the said ring being tubular and provided with outwardly extending threaded bosses, a floating rim on the peripheral face of the said body, screws engaging the said floating rim and screwing into the said bosses, and a solid rubber tread attached to the said floating rim.

4. A resilient vehicle tire, comprising a resilient body in the form of a hollow annulus adapted to be fastened to the felly of a wheel, a ring embedded in the said body adjacent the peripheral face thereof, the said ring being tubular and provided with outwardly extending threaded bosses having flanges at their ends, a floating rim on the peripheral face of the said body, screws engaging the said floating rim and screwing into the said bosses, and a solid rubber tread attached to the said floating rim.

5. A resilient vehicle tire, comprising a resilient body in the form of a hollow annulus, tubular outer and inner rings embedded in the said body adjacent the outer and inner faces thereof, the rings having threaded bosses of which the bosses of the inner ring extend inwardly and the bosses of the outer ring extend outwardly, screws engaging the said bosses of the inner ring to fasten the said body to the felly of a wheel, a floating rim fitting the peripheral face of the said body, screws engaging the said rim and screwing into the bosses of the said outer ring, and a tread attached to the said floating rim.

6. A resilient vehicle tire, comprising a resilient body in the form of a hollow annulus, tubular outer and inner rings embedded in the said body adjacent the outer and inner faces thereof, the rings having threaded bosses of which the bosses of the inner ring extend inwardly and the bosses of the outer ring extend outwardly, screws engaging the said bosses of the inner ring to fasten the said body to the felly of a wheel, a floating rim fitting the peripheral face of the said body, screws engaging the said rim and screwing into the bosses of the said outer ring, a tread attached to the said floating rim, and washers on the said bosses and embedded in the outer and inner faces of the said body.

7. In a resilient vehicle tire, a resilient body in the form of a hollow annulus having side walls made in separated layers of rubber, and inner and outer walls of rubber integral with the outer and inner ends of the said side walls and having fabric inserts.

IVAN NAIR KEIM.